(12) United States Patent
Weaver

(10) Patent No.: US 10,785,969 B2
(45) Date of Patent: Sep. 29, 2020

(54) DEVICE TO FACILITATE HAULING A FISH OUT OF WATER

(71) Applicant: Steven Weaver, Cocoa Beach, FL (US)

(72) Inventor: Steven Weaver, Cocoa Beach, FL (US)

( * ) Notice: Subject to any disclaimer, the term of this patent is extended or adjusted under 35 U.S.C. 154(b) by 263 days.

(21) Appl. No.: 16/009,241

(22) Filed: Jun. 15, 2018

(65) Prior Publication Data
US 2019/0380317 A1   Dec. 19, 2019

(51) Int. Cl.
*A01K 83/04* (2006.01)
*A01K 97/00* (2006.01)

(52) U.S. Cl.
CPC .............. *A01K 83/04* (2013.01); *A01K 97/00* (2013.01)

(58) Field of Classification Search
CPC .. A01K 83/02–06; A01K 85/02; A01K 85/12; A01K 85/16; A01K 97/00
See application file for complete search history.

(56) References Cited

U.S. PATENT DOCUMENTS

| | | | | |
|---|---|---|---|---|
| 556,494 A | * | 3/1896 | Dales | A01K 83/06 43/41 |
| 573,572 A | * | 12/1896 | Dales | A01K 83/06 43/41 |
| 1,470,842 A | * | 10/1923 | Hyams | A01K 83/06 43/41 |
| 1,734,612 A | * | 11/1929 | Coleman | A01K 83/02 43/36 |
| 2,110,382 A | * | 3/1938 | Martin | A01K 85/16 43/42.04 |
| 2,302,206 A | * | 11/1942 | Gibson | A01K 83/06 43/41 |
| 2,445,461 A | * | 7/1948 | St John | A01K 83/02 43/35 |
| 2,487,344 A | * | 11/1949 | Lambert | A01K 83/06 43/41 |
| 2,557,577 A | * | 6/1951 | Soma | A01K 83/06 43/41 |
| 2,569,465 A | * | 10/1951 | Farr | A01K 85/16 43/42.06 |
| 2,600,314 A | * | 6/1952 | Miner | A01K 83/06 43/41 |
| 2,639,536 A | * | 5/1953 | Hartman | A01K 83/06 43/41 |
| 2,659,995 A | * | 11/1953 | Hagstrom | A01K 85/16 43/42.06 |
| 2,682,128 A | * | 6/1954 | Weigandt | A01K 85/16 43/42.22 |

(Continued)

FOREIGN PATENT DOCUMENTS

| | | | | |
|---|---|---|---|---|
| CA | 2269867 A1 | * | 10/1999 | ............. A01K 85/16 |
| EP | 2567615 A1 | * | 3/2013 | ............. A01K 85/01 |

(Continued)

*Primary Examiner* — Magdalena Topolski
*Assistant Examiner* — Morgan T Barlow
(74) *Attorney, Agent, or Firm* — The Iwashko Law Firm, PLLC; Lev Ivan Gabriel Iwashko

(57) ABSTRACT

A fish hauling device, including a rope, a plurality of hooks, and a sleeve, including a body comprising a hollow cylinder, a plurality of rope attachment apertures disposed at a first end of the body to allow the rope to be attached thereto, and a plurality of slots to disposed at a second end of the body to allow the plurality of hooks to be attached thereto.

3 Claims, 5 Drawing Sheets

(56) References Cited

U.S. PATENT DOCUMENTS

| | | | | |
|---|---|---|---|---|
| 2,722,764 A | * | 11/1955 | Juhrend | A01K 85/02 43/35 |
| 2,736,124 A | * | 2/1956 | Wittmann, Jr. | A01K 85/16 43/42.23 |
| 2,763,086 A | * | 9/1956 | Johnson | A01K 83/06 43/44.2 |
| 2,766,544 A | * | 10/1956 | Silverthorne | A01K 85/16 43/42.06 |
| 2,769,267 A | * | 11/1956 | Ansley | A01K 83/06 43/41 |
| 2,791,057 A | * | 5/1957 | Memoli | A01K 85/16 43/42.06 |
| 2,848,836 A | * | 8/1958 | Dodd | A01K 83/06 43/44.6 |
| 2,922,245 A | * | 1/1960 | Sandburg | A01K 85/16 43/42.06 |
| 2,982,046 A | * | 5/1961 | Wilson | A01K 85/02 43/35 |
| 3,087,273 A | * | 4/1963 | Udo | A01K 85/16 43/42.06 |
| 3,139,695 A | * | 7/1964 | Makowski | A01K 85/16 43/42.36 |
| 3,170,756 A | * | 2/1965 | Butler | A01K 83/00 43/43.4 |
| 3,440,756 A | * | 4/1969 | Leadbetter | A01K 85/16 43/42.06 |
| 3,650,062 A | * | 3/1972 | Troyer | A01K 85/16 43/42.06 |
| 3,653,142 A | * | 4/1972 | Finch | A01K 85/16 43/42.06 |
| 3,688,430 A | * | 9/1972 | Balch | A01K 85/01 43/42.06 |
| 3,738,046 A | * | 6/1973 | Johnson | A01K 85/16 43/42.39 |
| 3,757,454 A | * | 9/1973 | Shurley | A01K 85/16 43/42.16 |
| 3,973,351 A | * | 8/1976 | Doiron | A01K 85/16 43/42.06 |
| 4,069,609 A | * | 1/1978 | Demy | A01K 85/16 43/42.06 |
| 4,141,171 A | * | 2/1979 | Muddiman | A01K 85/16 43/42.39 |
| 4,166,334 A | * | 9/1979 | Talalaj | A01K 85/02 43/35 |
| 4,217,721 A | * | 8/1980 | Hershberger | A01K 83/00 43/42.1 |
| 4,438,583 A | * | 3/1984 | Sullivan | A01K 85/16 43/42.06 |
| 4,553,348 A | * | 11/1985 | Cooper | A01K 85/16 43/42.06 |
| 4,648,198 A | * | 3/1987 | Sauve | A01K 85/16 43/42.06 |
| 4,817,325 A | * | 4/1989 | Thomas | A01K 85/02 43/42.1 |
| 4,835,897 A | * | 6/1989 | Rudolph | A01K 85/16 43/42.06 |
| 4,881,340 A | * | 11/1989 | Davis | A01K 85/16 43/42.06 |
| 4,914,851 A | * | 4/1990 | Acker | A01K 85/02 43/42.05 |
| 5,031,350 A | * | 7/1991 | Rabideau | A01K 85/02 43/42.1 |
| 5,319,876 A | * | 6/1994 | Vlahek | A01K 91/06 43/43.4 |
| 5,515,638 A | * | 5/1996 | Shirley | A01K 91/00 43/15 |
| 5,564,216 A | * | 10/1996 | McMillan | A01K 83/02 43/35 |
| 5,787,633 A | * | 8/1998 | Taylor | A01K 85/16 43/42.02 |
| 5,934,007 A | * | 8/1999 | Ellestad | A01K 85/16 43/42.06 |
| 6,574,908 B1 | * | 6/2003 | Sanner | A01K 83/02 43/36 |
| 6,993,866 B1 | * | 2/2006 | Strange | A01K 85/01 43/42.31 |
| 7,383,659 B1 | * | 6/2008 | Honkanen | A01K 85/01 43/26.2 |
| 2002/0032977 A1 | * | 3/2002 | Wacha | A01K 85/00 43/4 |
| 2005/0198889 A1 | * | 9/2005 | Lubinsky | A01K 91/10 43/42.02 |
| 2006/0016118 A1 | * | 1/2006 | Zuk | A01K 97/06 43/42.09 |
| 2006/0042147 A1 | * | 3/2006 | Jenkins | A01K 85/16 43/42.09 |
| 2006/0117641 A1 | * | 6/2006 | Kumlin | A01K 85/16 43/42.22 |
| 2006/0236588 A1 | * | 10/2006 | Rapelje | A01K 85/18 43/42.29 |
| 2006/0260180 A1 | * | 11/2006 | Hong | A01K 85/16 43/42.39 |
| 2007/0033857 A1 | * | 2/2007 | Myers | A01K 85/02 43/44.9 |
| 2012/0047790 A1 | * | 3/2012 | Hess | A01K 85/01 43/42 |
| 2014/0325890 A1 | * | 11/2014 | Chennaz | A01K 85/01 43/42.06 |
| 2015/0047248 A1 | * | 2/2015 | Riddle | A01K 85/02 43/43.1 |
| 2015/0327529 A1 | * | 11/2015 | Zimmerman | A01K 99/00 43/25.2 |
| 2016/0135440 A1 | * | 5/2016 | Thompson | A01K 85/16 43/42.53 |
| 2018/0064082 A1 | * | 3/2018 | Scutchfield | A01K 85/02 |
| 2018/0132461 A1 | * | 5/2018 | Caldeira | A01K 85/16 |
| 2019/0141975 A1 | * | 5/2019 | Quiles | A01K 97/045 43/4.5 |
| 2019/0297864 A1 | * | 10/2019 | League | A01K 83/06 |

FOREIGN PATENT DOCUMENTS

| | | | | |
|---|---|---|---|---|
| FR | 1317262 A | * | 2/1963 | A01K 85/16 |
| FR | 2117798 A1 | * | 7/1972 | A01K 97/00 |
| GB | 191221576 A | * | 8/1913 | A01K 83/06 |
| GB | 236820 A | * | 7/1925 | A01K 83/02 |
| GB | 2055531 A | * | 3/1981 | A01K 85/16 |
| WO | WO-0219815 A1 | * | 3/2002 | A01K 85/00 |
| WO | WO-2009144337 A2 | * | 12/2009 | A01K 85/01 |

* cited by examiner

DEVICE TO FACILITATE HAULING A FISH OUT OF WATER

BACKGROUND

1. Field

The present general inventive concept relates generally to a device to facilitate in hauling a fish out of water.

2. Description of the Related Art

For avid fishermen, hardly any excitement may compare to landing a large catch. However, depending on the surface on which one may be fishing, catching that big fish or hauling it upward can be a difficult and heavy process without the right equipment, resulting to a great disappointment if the fish gets away.

Therefore, there is a need for a device that facilitates hauling a fish out of water once it is caught.

Also, there is a need for a device that facilitates hauling a fish out of water when fishing on a pier or other elevated surface that is far from the water.

SUMMARY

The present general inventive concept provides a device to facilitate in hauling a fish out of water.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing a fish hauling device, including a rope, a plurality of hooks, and a sleeve, including a body comprising a hollow cylinder, a plurality of rope attachment apertures disposed at a first end of the body to allow the rope to be attached thereto, and a plurality of slots to disposed at a second end of the body to allow the plurality of hooks to be attached thereto.

The first hauling device may further include a plurality of slot protrusions disposed at the second end of the body to protrude inwardly toward a center of the body.

The first hauling device may further include a plurality of finger slots disposed on a surface of the body to provide a grip for a user.

Each of the plurality of hooks may include an attachment portion to loop through the slot and wrap around a bottom end of the sleeve, such that the attachment portion is connected to a bottom portion of the sleeve.

The fish hauling device may further include a plurality of finger slots disposed on a surface of the body, and a split portion disposed along a length of the body between the plurality of finger slots to allow a user to increase a size of the split portion by pulling the body apart using the plurality of finger slots.

BRIEF DESCRIPTION OF THE DRAWINGS

These and/or other features and utilities of the present generally inventive concept will become apparent and more readily appreciated from the following description of the embodiments, taken in conjunction with the accompanying drawings of which.

DETAILED DESCRIPTION

Various example embodiments (a.k.a., exemplary embodiments) will now be described more fully with reference to the accompanying drawings in which some example embodiments are illustrated. In the figures, the thicknesses of lines, layers and/or regions may be exaggerated for clarity.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like/similar elements throughout the detailed description.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Figure 1:
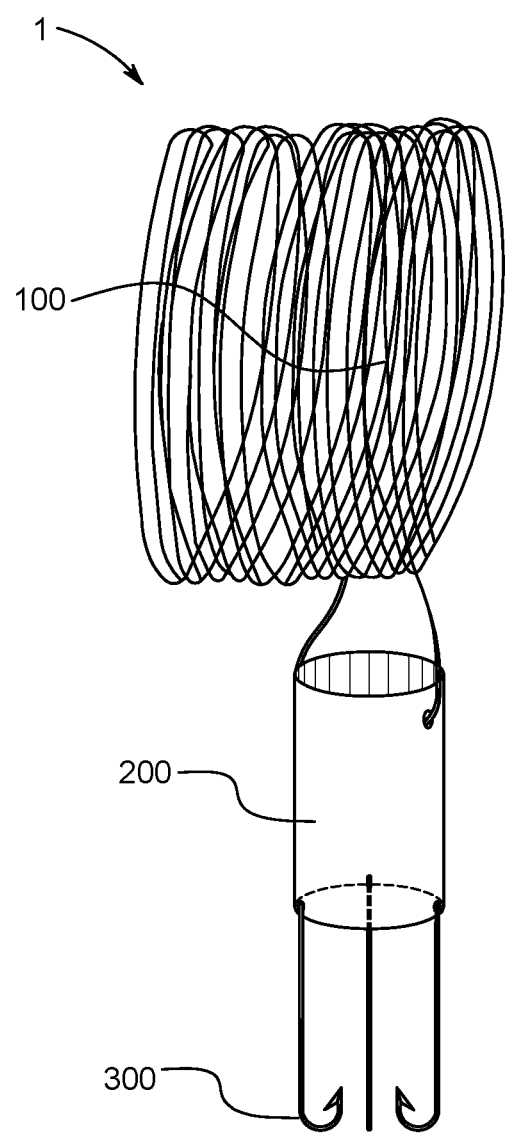
FIG. 1 illustrates a fish hauling device, according to an exemplary embodiment of the present general inventive concept.

FIG. 1 illustrates a fish hauling device 1, according to an exemplary embodiment of the present general inventive concept.

The fish hauling device 1 may include a rope 100, a sleeve 200, and a plurality of hooks 300, but is not limited thereto.

Figure 2:
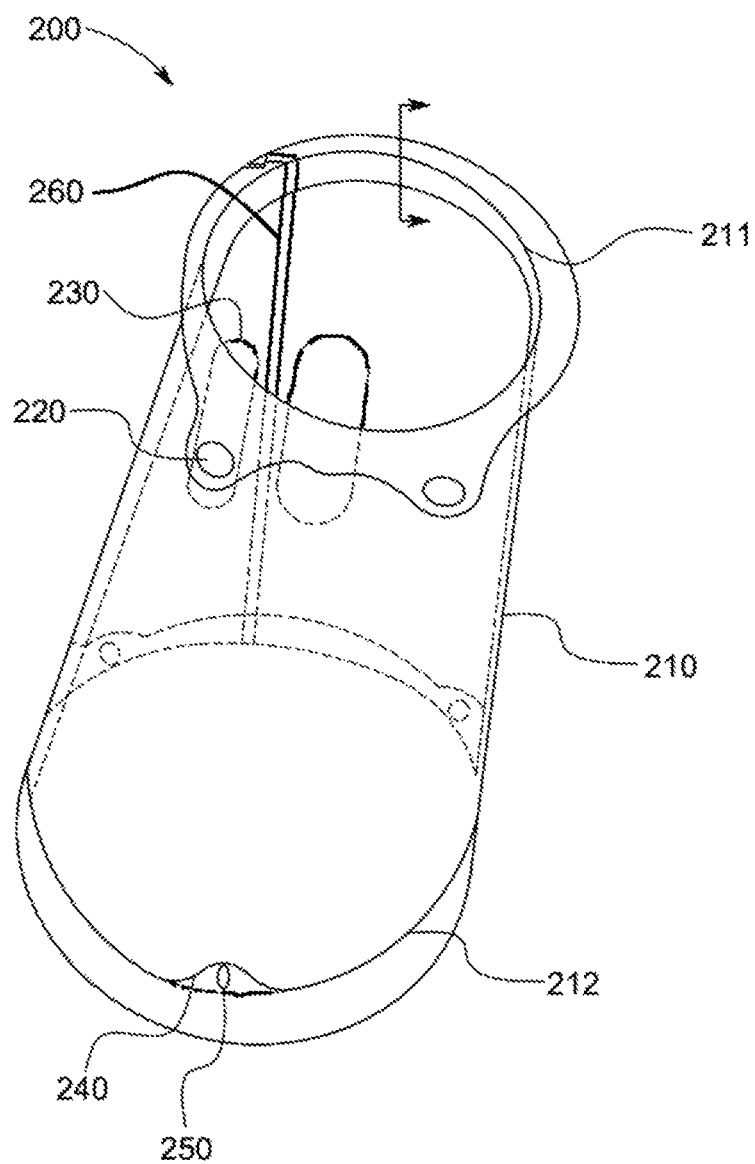
FIG. 2 illustrates a zoomed-in angled perspective view of a sleeve, according to an exemplary embodiment of the present general inventive concept.

FIG. 2 illustrates a zoomed-in angled perspective view of the sleeve 200, according to an exemplary embodiment of the present general inventive concept.

Figure 3:
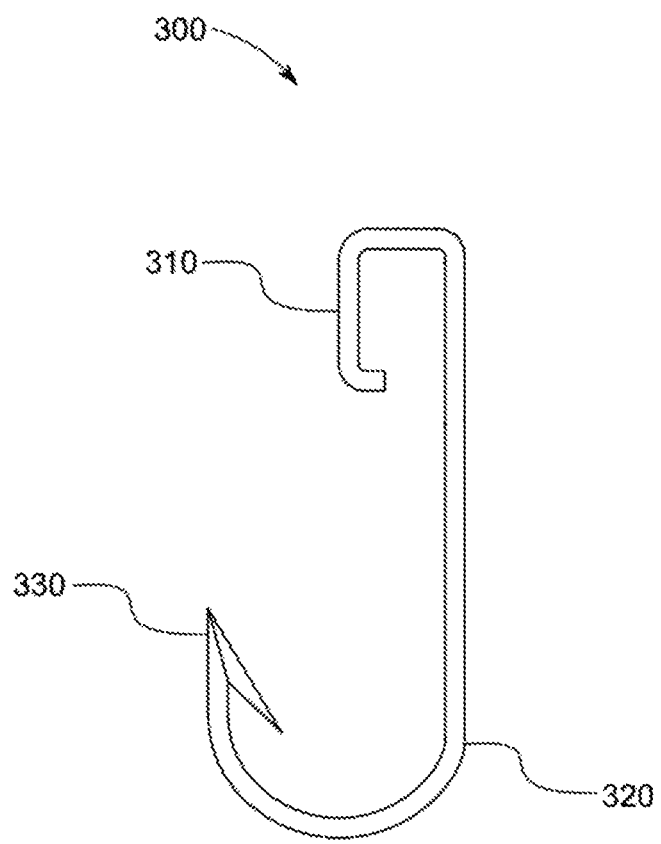
FIG. 3 illustrates a zoomed-in side view of a hook attached to the fish hauling device, according to an exemplary embodiment of the present general inventive concept.

FIG. 3 illustrates a zoomed-in side view of a hook 300 attached to the fish hauling device 100, according to an exemplary embodiment of the present general inventive concept.

The fish hauling device 100, and components thereof, may be constructed from metal, plastic, rope, cloth, polyester, cotton, wool, rubber, leather, faux-leather, hooks, loops, wiring, VELCRO, adhesives, and any other material known to one of ordinary skill in the art.

Referring to FIG. 2, the sleeve 200 may include a body 210, a plurality of rope attachment apertures 220, a plurality of finger slots 230, a plurality of slot indentations 240, a plurality of slots 250, and a split portion 260.

The body 210 may have a cylindrical shape, a rectangular prism shape, etc., but is not limited thereto, and may be constructed from plastic (e.g., high density plastic), metal, wood, or any other material known to one of ordinary skill in the art.

The body 210 may have various dimensions, and is not limited to width, length, circumference, thickness, or height.

The body 210 may include a first end 211 and a second end 212, which may include rims having open apertures.

The plurality of rope attachment apertures 220 may be disposed at the first end 211 of the body 210, in order to allow the rope 100 to be woven therethrough.

The plurality of finger slots 230 may be slots disposed throughout the body 110 to a user to easily grip the body 110 and to pull the body 110 apart along at the split portion 260.

The plurality of slot indentations 240 may be disposed at the second end 212 of the body 210, and may protrude inwards toward a center of the body 210.

The plurality of slots 250 may be also called hook mounting slots/apertures to allow the plurality of hooks 300 to each be mounted thereto, and may each be disposed at the second end 212 of the body 210 on at least a portion of the plurality of slot indentations 240.

The split portion 260 may be included along a length of the body 210, in order to allow a finishing line to be inserted within the body 210 without requiring the user to "thread" the fishing line through the first end 211 or the second end 212 of the body 210.

Referring to FIGS. 1 and 2, the plurality of hooks 300 may each be mounted to the plurality of slots 250 such that the plurality of hooks 300 are curved inwards, to allow for easier fish hoisting.

The hook 300, which is preferably provided in plurality, may include an attachment portion 310, a connecting portion 320, and a pointed end 330.

The attachment portion 310 may be connected, at a first end of the hook 300, to the sleeve 200 via the slot 250. More specifically, the attachment portion 310 may have a rounded shape to allow a portion of the hook 300 to enter the slot 250 (i.e., the attachment portion 310 loops through the slot 250 and wrap around a bottom end of the sleeve 200), such that the attachment portion is connected to a bottom portion of the sleeve 200.

The pointed end 330 may be disposed at a second end of the hook 300, and may be utilized to grab onto a fish as the fish is being hauled out the water.

The connecting portion 320 may be disposed between the attachment portion 310 and the pointed end 330, such that the hook 300 is curved along the connecting portion 320.

Figure 4A:
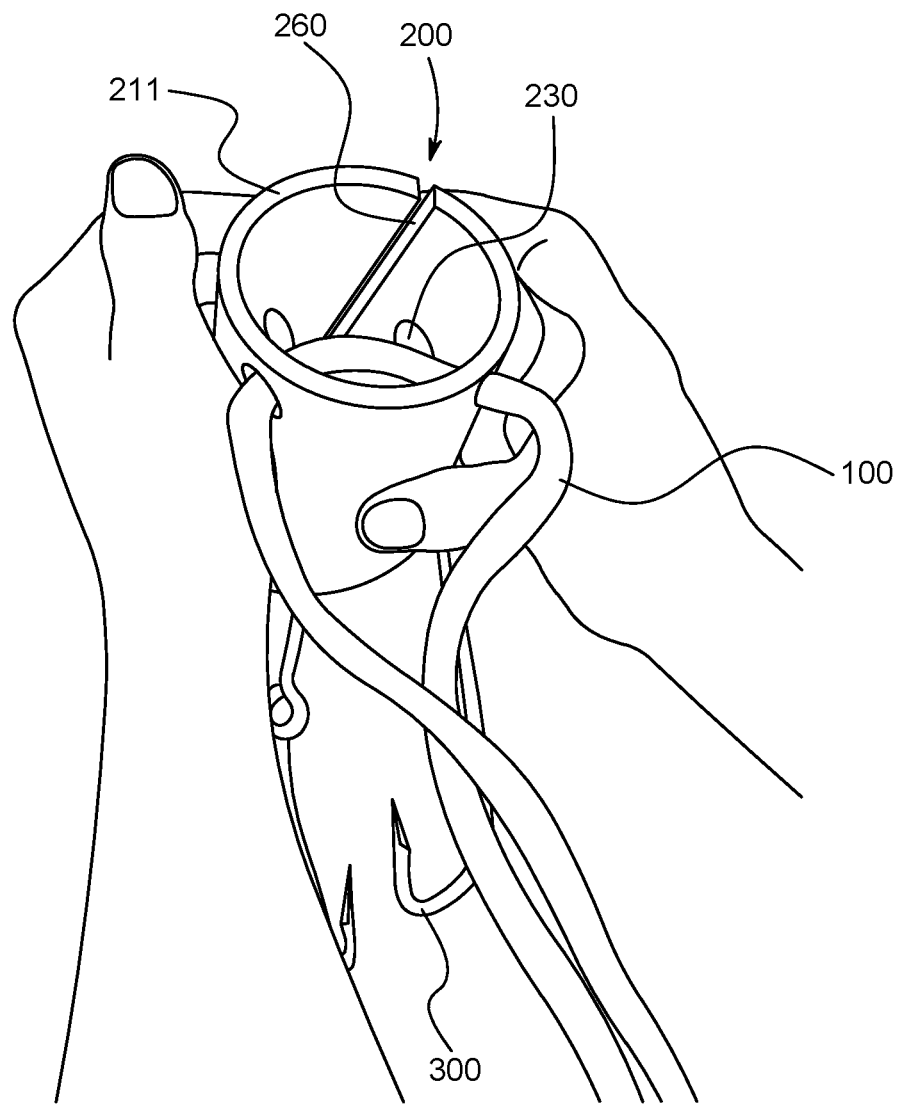
FIG. 4A illustrates a top angled perspective view of the fish hauling device being pulled apart at the split portion by a user utilizing the plurality of finger sots to allow a fishing line to be inserted therein, according to an exemplary embodiment of the present general inventive concept.

FIG. 4A illustrates a top angled perspective view of the fish hauling device 1 being pulled apart at the split portion 260 by a user utilizing the plurality of finger sots 230 to allow a fishing line to be inserted therein, according to an exemplary embodiment of the present general inventive concept.

Figure 4B:
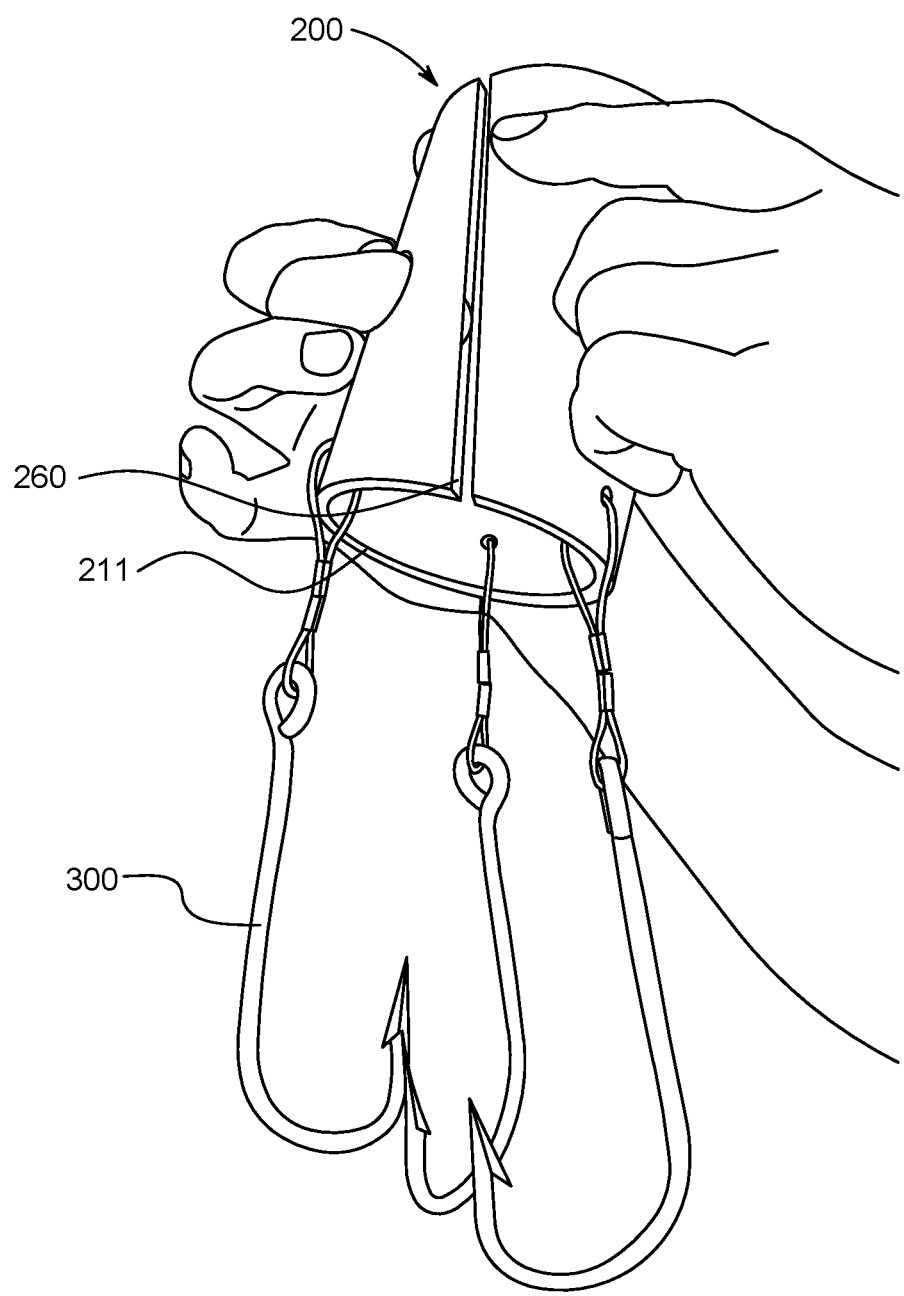
FIG. 4B illustrates a bottom angled perspective view of the fish hauling device being pulled apart at the split portion by a user utilizing the plurality of finger slots to allow a fishing line to be inserted therein, according to an exemplary embodiment of the present general inventive concept.

FIG. 4B illustrates a bottom angled perspective view of the fish hauling device 1 being pulled apart at the split portion 260 by a user utilizing the plurality of finger slots 230 to allow a fishing line to be inserted therein, according to an exemplary embodiment of the present general inventive concept.

As illustrated in FIGS. 4A and 4B, the user may place a finger from a left hand into one of the plurality of finger slots 230, and another finger from a right hand into another one of the plurality of finger slots 230, and then use thumbs and or portions of hands of the user to apply pressure to the body 210 until the split portion 260 becomes larger, thereby allowing a fishing line to be inserted thereinside. As such, the split portion 260 may be disposed along a length of the body 210 between at least two of the plurality of finger slots 230 to allow a user to increase a size of the split portion 260 by pulling the body 210 apart using the plurality of finger slots 230.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

The invention claimed is:

1. A fish hauling device, comprising:
    a rope;
    a plurality of hooks; and
    a sleeve, comprising:
        a body comprising a hollow cylinder,
        a plurality of rope attachment apertures disposed at a first end of the body to allow the rope to be attached thereto,
        a plurality of slot indentations disposed at a second end of the body to curvedly protrude inwardly from the sleeve toward a center of the body, such that the plurality of slot indentations only curves inward, and
        a plurality of slots such that each is disposed on at least a portion of the plurality of slot indentations with the plurality of hooks attached thereto;
        a plurality of finger slots disposed through a surface of the body; and
        a split portion disposed along a length of the body between the plurality of finger slots to allow a user to increase a size of the split portion by pulling the body apart using the plurality of finger slots.

2. The fish hauling device of claim 1, wherein each of the plurality of hooks comprises an attachment portion to loop through the slot and wrap around a bottom end of the sleeve, such that the attachment portion is connected to a bottom portion of the sleeve.

3. A fish hauling device, comprising:

a rope;

a plurality of hooks; and a sleeve, comprising:
- a cylindrical shaped body,
- a first rim circumferentially disposed on a first end of the cylindrical shaped body, such that the first rim extends away from an outer surface of the cylindrical shaped body,
- a plurality of rope attachment apertures disposed on the first rim of the cylindrical shaped body to allow the rope to be attached thereto,
- a second rim circumferentially disposed on a second end of the cylindrical shaped body, such that the second rim has a different shape than the first rim,
- a plurality of slot indentations disposed at the second end of the cylindrical shaped body to curvedly protrude inwardly from the second rim toward a center of the cylindrical shaped body, and
- a plurality of slots, such that each is disposed on at least a portion of the plurality of slot indentations with the plurality of hooks attached thereto;
- a plurality of finger slots disposed through a surface of the body; and
- a split portion disposed along a length of the body between the plurality of finger slots to allow a user to increase a size of the split portion by pulling the body apart using the plurality of finger slots.

* * * * *